United States Patent Office 3,108,956
Patented Oct. 29, 1963

3,108,956
LOW VISCOSITY WATER-BASE DRILLING MUD
Charles D. Dever and Robert F. Ryan, Saginaw, Mich., assignors to The Dow Chemical Company, Midland, Mich., a corporation of Delaware
No Drawing. Filed May 9, 1960, Ser. No. 27,522
7 Claims. (Cl. 252—8.5)

The invention relates to the art of drilling wells employing aqueous-base drilling muds and has particular reference to controlling the viscosity and gel-forming properties of such muds when so employed.

In well drilling operations wherein a well is drilled by the use of a rotary drill or bit, the borehole is generally maintained filled by a drilling fluid, such as a mud, which is circulated therein. The drilling fluid is usually pumped down through the drill stem, out through holes provided in the drill bit, and is returned to the surface through the annular passageway between the drill stem and the well casing. The drilling fluid, e.g., mud, performs a number of functions among which are plastering the walls of the borehole to lessen loss of fluid into the formation, lubricating the drill stem and bit, carrying the cuttings from the bit up the borehole to the surface, and providing a hydrostatic head against the walls of the well to prevent uncontrolled escape of gases or liquids from the formations traversed by the borehole.

Satisfactory drilling muds must have a sufficiently high gel strength to avoid the settling of suspended materials therein during circulation and have a viscosity which is sufficiently low to permit high rates of circulation without overloading the mud pumps.

A typical conventional aqueous-base drilling mud comprises a suspension of clay, preferably a colloidal suspension of bentonite-type clay. The amount of clay is sufficient to impart desired viscosity and gel-forming characteristics thereto. Additional materials are usually also present in varying amounts among which are weighting agents, thinners, fluid loss agents to reduce the likelihood of lost circulation, lime to lessen the tendency of the formation clays to swell, pH control agents, and preservatives to resist contamination of the mud.

During use the gel strength and viscosity of a drilling mud tend to increase to undesirably high values. The original composition of the mud, fluids such as electrolytes encountered, the character of the rock formation traversed, and the temperature and pressures to which the mud is subjected affect the extent of change in mud during use. Usually, deep wells cause greater changes in the mud and present more difficulties than shallower wells.

Attempts to overcome the increase in viscosity and gel strength of drilling muds have been made and include adding water and compositions thereto which serve as thinners such as quebracho, lignin or lignosulfonates, and phosphates to the mud. Adding water to control viscosity or thickening reduces the clay concentration and lessens the density thereby necessitating further adjustments and weighting materials. Materials known to impart some thinning properties, such as those set out above, have been of value but have not been fully satisfactory, either because of having insufficient thinning effect on the mud encountered in all drilling operations, or because the material imparts some undesirable property to the mud.

A need, therefore, exists for an improved aqueous drilling mud, the viscosity and gel strength of which may be effectively controlled without sacrificing other desirable properties.

It is, accordingly, an object of the invention to provide an improved aqueous drilling mud which satisfies this need.

The invention is based upon the discovery that the addition of a copolymer of maleic anhydride and an N-vinyl ring compound containing a single nitrogen atom, to which the vinyl group is attached, and a carbonyl group in adjacent positions in the ring (as hereinafter described) to a water base bentonite-type mud and to oil-water emulsion type muds, a pronounced reduction in viscosity and thickening is effected while good circulation, lower fluid loss, and good suspending properties of the mud are maintained. The discovery has especial significance when oil-water emulsion type muds, e.g., one containing between 5 and 40, and more often between 10 and 15 percent, by weight of crude oil or diesel oil and balance water-base mud, are used because the copolymer employed in the invention has an emulsifying effect on the oil and water in such muds.

The invention, therefore, is an improved water-base or emulsion-type drilling mud and method of use thereof, said mud comprising water, clay, and between 0.01 and 10.0, and preferably between 0.05 and 2.0 pounds per 42-gallon barrel of mud, of the copolymer described hereinbelow.

The polymer for use in the practice of the invention is prepared by copolymerizing maleic anhydride and an N-vinyl ring compound selected from the group consisting of N-vinyl morpholinone, N-vinyl pyrrolidone, and N-vinyl cyclic carbamates, e.g., N-vinyl-2-oxazinidinone, N-vinyl-2-oxazolidinone, and substituted N-vinyl-2-oxazolidinones having the formula:

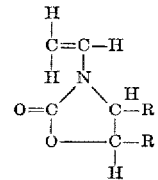

wherein one R is the methyl, ethyl, or phenyl radical and the other R is hydrogen or the methyl radical, and the free acids and water-soluble salts thereof obtained by hydrolysis of the acid anhydride rings in said copolymers.

Characteristic of the substituted N-vinyl-2-oxazolidinone compounds are the N-vinyl-x-alkyl-2-oxazolidinones, e.g., N-vinyl-5-methyl-2-oxazolidinone, N-vinyl-4-methyl-2-oxazolidinone, N-vinyl-5-ethyl-2-oxazolidinone, and N-vinyl-4-ethyl-2-oxazolidinone.

The manner of preparation and properties of alkyl-substituted N-vinyl-2-oxazolidinones, suitable for use in the preparation of the copolymer for use in the practice of the invention, is set out in detail in U.S. Patent 2,919,279.

The copolymer useful in the practice of the invention may be represented as containing a plurality of recurring groups having the structure:

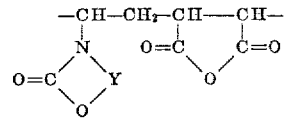

wherein Y is a divalent trimethylene radical or the divalent radical —RCH—RCH— in which the R substituents have the aforementioned significance. The copolymers useful in drilling fluids in accordance with the invention, as aforesaid, include the free acids and water-soluble salts obtained by hydrolysis of the acid anhydride rings in the above structure. Salts such as the alkali metal and ammonium salts are prepared by opening the anhydride rings by reaction with aqueous alkali metal hydroxides or carbonates or ammonium hydroxide. Such salts are readily soluble in both cold and hot water.

The copolymers employing an N-vinyl-cyclic carbamate, as defined above, with maleic anhydride may be prepared in a liquid medium under the influence of free radicals. In general, it is desirable to carry out the reaction in an inert organic solvent and to employ a peroxide catalyst or the like as a source of free radicals to initiate the reaction. For use in the invention a copolymer prepared by reacting between 10 and 90 mole percent of the N-vinyl-cyclic carbamate and between 90 and 10 mole percent of maleic anhydride may be employed. Between 47 and 53 moles of each reactant are usually used. It is preferred, however, to employ the N-vinyl cyclic carbamate and maleic anhydride reactants in substantailly equimolar proportions although an excess of either reactant in accordance with the above mole ratios may be employed if desired. The reaction is initiated and proceeds readily when the reactants are mixed and heated with catalysts capable of liberating free radicals, preferably at temperatures of from about 35° to 120° C. Alternatively, free radicals may be generated in the reaction mixture by irradiation with ultraviolet light, X-rays, or gamma rays.

Any suitable inert organic solvent may be employed in the reaction. In most instances, it is desirable to employ one or a mixture of aromatic hydrocarbons, such as benzene, toluene or xylene, or halohydrocarbons, such as methylene chloride or 1,2-dichloroethane, as the solvent. In such systems the reactants are soluble while the copolymer product precipitates as formed and may be recovered by filtration or decantation. Alternatively, solvents, such as acetone or methyl ethyl ketone, in which the copolymer product is soluble, may be employed, in which case the copolymer product may be recovered by conventional processes such as by distilling off the solvent. In any case, it is generally desirable that the reactants be employed in an amount of from about 5 to 25 percent by weight of the solution in the original reaction mixture.

Any suitable catalyst capable of yielding free radicals when heated in the reaction temperature range may be employed. Such catalysts include azo-compounds such as azobisisobutyronitrile and peroxides such as lauroyl peroxide, benzoyl peroxide, 2,4-dichlorobenzoyl peroxide, ditertiary-butyl peroxide, cumene hydroperoxide, tertiary-butyl hydroperoxide and the like.

The reaction temperature employed in the preparation of the copolymer will vary depending upon the concentration of reactants, the type and amount of catalyst, and the particular solvent or solvents employed. It is generally convenient to initiate the reaction at as low a temperature as the particular catalyst requires for producing an appreciable yield of free radicals and to complete the reaction at the boiling temperature of the solvent system employed. With highly active catalysts such as azobisisobutyronitrile the reaction may be initiated at temperatures of from 35° to 45° C. and completed by heating at such temperatures for a period of time. With less active catalysts, such as lauroyl peroxide, heating to a temperature of about 60° to 80° C. may be required for achieving an appreciable rate of reaction and the mixture may be heated at temperatures of from 80° to 120° C. to complete the reaction. In initiating reactions at temperatures above about 60° C., heating of the mixture should be gradual and controlled in order to avoid the sudden onset of polymerization at an uncontrollable rate.

The copolymerization reaction is conveniently carried out under normal atmospheric pressures although a reaction under somewhat elevated or reduced pressures may be carried out if desired. Commercially available maleic anhydride sometimes contains appreciable quantities of free acid which may foster decomposition of the cyclic carbamate reactant when the reaction mixture is heated. The latter problem can be minimized by neutralizing the free acid, as, for example, by passing ammonia through the reaction mixture, before initiating the exothermic copolymerization.

The copolymer employed in the examples are designated according to the K value which is a function of the molecular weight, higher K values indicating higher molecular weight. The significance and method of finding K values is described in Cellulose Chemie, vol. 13, page 58 (1932), by H. Fikentscher. K values are found according to the method therein described, wherein the polymeric solute is dissolved in a solvent, the relative viscosity thereof measured by passing through a specified aperture at a given temperature, and the K value calculated according to the equation:

Relative viscosity $= 10^{c[0.001K+ 0.000075K^2/1+0.0015K_c]}$ where $c$ is the number of grams of polymeric solute per 100 cc. of solution. Tables are available from which K values can be read directly from the relative viscosity values.

The solvent employed in finding the K values of the copolymer employed according to the invention was 85 percent ethyl alcohol, the remaining 5 percent being a denatured substance and water known as 2B alcohol. The polymer was added to the solvent in the amount of 1 percent by weight and the viscosity was determined at 25° C.

Among the factors affecting the K values of a copolymer are purity and ratio of monomers, the reaction medium employed, the temperature of polymerization, and the kind and amount of catalyst. A copolymer having a K value of between 11 and 70 is satisfactory for the practice of the invention but one having a K value between 17 and 34 is preferable. Although an exact correlation between K values and molecular weight is not feasible, molecular weights in the range of 50,000 to 1,000,000 are suggested as satisfactory for use in the practice of the invention.

The known copolymers of maleic anhydride and either N-vinyl morpholinone or N-vinyl pyrrolidone are equally satisfactory in the practice of the invention. Mixtures of any of the above named N-vinyl monomers may be co-polymerized with maleic anhydride in the practice of the invention.

The basic formulation followed in the preparation of the muds used in the blank runs and examples of the invention consists essentially of admixing a weighed quantity of dry clay to a measured volume of water while stirring with an impeller type agitator, and continuing to mix for about 10 minutes after addition of the water, to make a substantially uniform mixture. Adequate additional stirring was given when the polymer or other material was added to the basic mud composition. All mud compositions were stored for at least 24 hours after preparation prior to being tested in the examples and blank runs. The tests including density, viscosity, gel strength, and filtration or fluid loss, were conducted according to the procedure described in Recommended Practice for Standard Field Procedure for Testing Drilling Fluids, API RP 29, 3rd Edition (May 1950), procurable from the American Petroleum Institute, Dallas, Texas. A detailed discussion of drilling muds and tests therefor is also set out in Principles of Drilling Mud Control, 10th Edition, published by Petroleum Extension Service, University of Texas, Austin, Texas (1955).

SERIES 1

A series of tests consisting of blank runs A to F for comparative purposes and Examples 1, 2, and 3, illustrative of the invention, were made by first preparing a base mud by admixing a bentonite clay, having a yield of 100 barrels per ton, with water in an amount of 20 pounds of clay per barrel of water. The mud thus made had a density of 8.7 pounds per gallon. The temperature of the mixture was 76° F. during the preparation and testing thereof. To simulate brine-contaminated mud similar to that frequently in use in drilling operations, NaCl was admixed with the mud in those tests so indicated in Table I. Also, since it is the practice to raise the pH of mud in a number of drilling operations, NaOH was admixed with the mud in certain tests as indicated in Table I. The blank runs A to F were prepared by admixing with the base mud, various known thinning agents. The examples of the invention were prepared by admixing with the base mud varying percents of the copolymer in accordance with the invention. The efficacy of a thinner admixed with a drilling mud is indicated by its effect one gel strength and viscosity. The amount and type of additaments added to the base mud and the viscosity and gel strength were determined by the Stormer viscosimeter and are set out in Table I.

Table II

| Example No. | 50:50 Copolymer of N-vinyl-5-methyl-2-oxazolidinone and maleic anhydride added to Mud | | | Viscosity in cps. | Gel Strength in Grams | |
|---|---|---|---|---|---|---|
| | Type | K Value | Amount in Pounds/Barrel | | Initial | After 10 Min. |
| 4 | Na+ form | K27 | 0.05 | 24 | 15 | 90 |
| 5 | do | K27 | 0.15 | 12 | 0 | 50 |
| 6 | do | K27 | 0.25 | 10 | 0 | 35 |
| 7 | do | K18 | 0.05 | 45 | 45 | 200 |
| 8 | do | K18 | 0.15 | 22 | 2 | 110 |
| 9 | do | K18 | 0.25 | 14 | 0 | 65 |
| 10 | do | K70 | 0.05 | 74 | 100 | (¹) |
| 11 | do | K70 | 0.15 | 31 | 5 | 150 |
| 12 | do | K70 | 0.25 | 14 | 0 | 60 |
| 13 | H+ form | K27 | 0.05 | 23 | 35 | 100 |
| 14 | do | K27 | 0.10 | 14 | 5 | 65 |
| 15 | do | K27 | 0.15 | 13 | 0 | 45 |
| 16 | do | K27 | 0.25 | 9 | 0 | 20 |
| 17 | do | K19 | 0.05 | 16 | 20 | 60 |
| 18 | do | K19 | 0.10 | 12 | 0 | 40 |
| 19 | do | K14.5 | 0.05 | 25 | 40 | 70 |

¹ No value obtained.

2500 parts of NaCl per million parts of mud were present in Examples 4–19.

Reference to Table II shows that either the acid, H+ form, or sodium salt, Na+ form, of the copolymer, having K values between 14.5 and 70 but preferably between 19 and 34 when added in amounts of 0.05 pound per 42-gallon barrel of mud, has a beneficial thinning effect on the mud as shown by lowered viscosity and gel

Table I

| Blank or Example No. | Thinner Added | | Other Additaments | | Viscosity in cps. | Gel Strength in Grams | |
|---|---|---|---|---|---|---|---|
| | Type | Amount in Pounds/Barrel | NaOH in Pounds/Barrel | NaCl in p.p.m. | | Initial | After 10 Min. |
| Blank A | None | | None | None | 18 | 0 | 32 |
| Blank B | do | | None | 2,500 | 45 | 80 | 120 |
| Blank C | Tannex (A tannin and lignin mixture) | 0.25 | 0.13 | 2,500 | 22 | 30 | 100 |
| Blank D | Lignox (Ca-ligno-sulfonate) | 0.25 | 0.13 | 2,500 | 88 | 140 | 190 |
| Blank E | Oxacol (partially oxidized coal acids) | 0.25 | None | 2,500 | 60 | 120 | 180 |
| Blank F | Q Broxin (Ferro-chrome lignosulfonate) | 0.50 | None | 2,500 | 36 | 50 | 115 |
| Example 1 | VOM-MA ¹ | 0.10 | None | None | 10 | 0 | 0 |
| Example 2 | VOM-MA | 0.10 | None | 2,500 | 13 | 0 | 50 |
| Example 3 | VOM-MA | 0.25 | None | 2,500 | 9 | 0 | 20 |

¹ VOM-MA is a 50:50 molar copolymer of the sodium salt of N-vinyl-5-methyl-2-oxazolidinone and maleic anhydride, having a K value of 27.

An examination of Table I shows that the practice of the invention employing the copolymer designated VOM-MA had a more pronounced thinning effect, as shown by the lower viscosity and gel strength, than either the mud in which no VOM-MA was used or in which known thinners were employed in similar or greater amounts. For instance, when Example 1 is compared to blank A, wherein substantially salt-free muds were employed, or when Examples 2 and 3 are compared to blank B, wherein salt-contaminated muds were employed, the examples show a marked superiority.

SERIES 2

This series of tests was run to show the thinning effect of the 50:50 molar copolymer of N-vinyl-5-methyl-2-oxazolidinone and maleic anhydride of varying K values when added to aqueous mud slurries in accordance with the invention. A water-base mud was prepared, as in Series 1, and was admixed with 2500 parts of NaCl per million parts of the mud but without addition of NaOH to raise the pH. Three different amounts of each of three K values copolymers were tested at 76° F. The results are set out in Table II.

strength. The improvement resulting from the use of the copolymer additament appears to decrease gradually so that noticeable effect will be experienced when as little as 0.01 pound per barrel is used. Similarly, the beneficial effect appears to level off at somewhere between around 1.0 pound of additament per barrel of mud but by extrapolation, beneficial effects would be expected up to as high as 10 pounds of copolymer per barrel of mud. However, an amount of copolymer between 0.05 and 4.0 pounds per barrel of mud appears to be the preferred amount to use.

SERIES 3

The procedure followed in the examples of Series 2, as shown in Table II, was repeated employing as the mud-thinner, in accordance with the invention, a copolymer of maleic anhydride and either N-vinyl morpholinone or N-vinyl pyrrolidone in substantially at 50:50 molar ratio. 2500 p.p.m. of NaCl were added to simulate brine conditions. The amounts of the copolymer employed, in pounds per 42-gallon barrel of mud, together with viscosity and gel strength values, are set out in Table III below.

Table III

| Example No. | 50:50 Copolymer of Either N-vinyl pyrrolidone or N-vinyl morpholinone | | | Viscosity in cps. | Gel Strength | |
|---|---|---|---|---|---|---|
| | Type | K value | Amount Added in Pounds/Barrel | | Initial | After 10 min. |
| 20 | H+ form MA:VP [1] | 30 | 0.05 | 14 | 15 | 45 |
| 21 | do | 30 | 0.10 | 12 | 0 | 35 |
| 22 | do | 30 | 0.15 | 10 | 0 | 0 |
| 23 | H form MA:VM [2] | 30 | 0.05 | 28 | 20 | 120 |
| 24 | do | 30 | 0.10 | 14 | 0 | 60 |
| 25 | do | 30 | 0.15 | 7 | 0 | 0 |

[1] Copolymer of maleic anhydride and vinyl pyrrolidone.
[2] Copolymer of maleic anhydride and vinyl morpholinone.
2500 parts of NaCl per million parts of mud were added.

The results of the examples set out in Table III show that copolymers of maleic anhydride and N-vinyl pyrrolidone and of maleic anhydride and N-vinyl morpholinone are effective to reduce the viscosity and gel strength of drilling muds. An amount of at least 0.15 pound of the copolymer per barrel of mud appears desirable. When such amount of the copolymer was employed, as shown in Examples 22 and 25, the viscosity and gel strength were definitely lower than those of blank run B of Table I wherein no thinner was employed in a NaCl-contaminated mud.

Further examples were run similar to those set out in Series 1 and 2 above, except different muds were employed among which were $BaSO_4$-weighted muds having a density of 13.4 pounds per gallon, lime mud, gypsum mud, salt water mud, subbentonite mud employing a clay yielding only 45 barrels per ton, plaster mud, phosphate mud, and red mud. Blank runs were made and then runs wherein varying amounts of either the acid or sodium salt form of the copolymer of N-vinyl-5-methyl-2-oxazolidinone and maleic anhydride of substantially a 50:50 molar ratio were admixed therewith up to 1.5 pounds per barrel of mud and aged at temperatures as high as 400° F. In all runs, the presence of the copolymer in accordance with the invention had a thinning effect as shown by lowered viscosity and gel strength values. The muds, therefore, so treated, permitted higher percents of hydratable clay to be suspended therein without an objectionable increase in viscosity.

Fluid loss tests, in accordance with the filtration test set out in API RP 29, were run on a number of muds prepared according to the invention. The filter loss was found to be unaffected, e.g., 0.38 pound of the copolymer (having a K value of 27) admixed per barrel of mud gave a fluid loss of 6 milliliters in 30 minutes and one to which 1.5 pounds of copolymer (K value of 27) per barrel of mud gave a fluid loss of 8 milliliters in 30 minutes. Muds having known thinners admixed therewith in comparable amounts, e.g., quebracho, sodium tetraphosphate, and calcium lignosulfonate, gave fluid loss values of from 6 to 16 milliliters in 30 minutes in fresh water muds and in muds containing NaCl brine.

The drilling fluid of the invention is employed in drilling wells using a circulating drilling fluid in accordance with conventional practice and the equipment employed and steps followed in the drilling operation according to the invention need not be altered. No especial precautions are needed and no undesirable effects due to the use of the mud are known to exist.

SERIES 4

To show the emulsifying effect of a copolymer of maleic anhydride and an N-vinyl cyclic carbamate, when admixed with an emulsion type drilling mud in accordance with the invention, one mud was prepared containing no emulsifying agent, designated blank run G, and two muds were prepared employing a copolymer in accordance with the invention, designated Examples 26 and 27. The muds prepared were of the type described in Composition Properties of Oil Well Drilling Fluids, by Rogers (1953), Gulf Publishing Co., Houston, Texas, in chapter XIV, page 497 et seq.

*Blank G.*—The mud of blank G was prepared as follows: 350 pounds (one 41-gallon barrel) of water and 15 pounds of sodium bentonite clay (100 lb./ton yield) were placed in a suitable mixing tank and mixed for 15 minutes. Thereafter No. 2 diesel oil, in an amount of 10 percent by volume of the above mixture was added thereto and stirred for 5 minutes. A representative sample was taken from the emulsion type mud thus made, placed in a 250-milliliter graduated cylinder, and allowed to stand. The mixture completely separated into an upper oil layer and a lower water layer in 30 minutes.

*Example 26.*—The mud of this example was prepared as in blank G except that 0.5 pound of the copolymer of N-vinyl-5-methyl-2-oxazolidinone and maleic anhydride, having a K number of 27, was admixed therewith. A sample of the mixture was placed in the 250-milliliter graduated cylinder, as in blank G. After standing 10 days, no separation into oil and water phases could be detected.

*Example 27.*—Example 26 was repeated except the amount of the copolymer was reduced to 0.1 pound. A sample was taken as in Example 26 and placed in the 250 milliliter graduate. After standing 10 days therein, no separation into oil and water phases could be detected.

The copolymer employed according to the invention has good emulsifying properties as shown by Examples 26 and 27.

The practice of the invention offers a number of advantages both in the effectiveness of the use of the copolymer and in the highly economical aspects associated with its use.

The invention having been described, what is claimed and desired to be protected by Letters Patent is:

1. A well drilling fluid characterized by low viscosity and low gel strength comprising an aqueous colloidal suspension of bentonite-type clay and between 0.05 and 2.0 pounds, per barrel of the drilling fluid, of a copolymer of maleic anhydride and an N-vinyl ring compound selected from the class consisting of N-vinyl morpholinone, N-vinylpyrrolidone, N-vinyl-2-oxazinidinone, N-vinyl-2-oxazolidinone, and substituted N-vinyl-2-oxazolidinones having the following formula

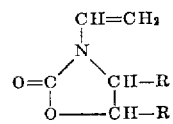

wherein one R is a substituent selected from the class consisting of methyl, ethyl, and phenyl groups and the other R is selected from the class consisting of hydrogen and the methyl group, said copolymer having a Fikentscher K value of between 11 and 70.

2. The well drilling fluid of claim 1 wherein the copolymer consists of a molar ratio of between 47 and 53 moles of each of the N-vinyl ring compound and the maleic anhydride.

3. The well drilling fluid of claim 2 wherein the copolymer employed is about a 50:50 mole ratio of maleic anhydride and the N-vinyl-5-alkyl-2-oxazolidinone.

4. The well drilling fluid of claim 3 wherein the alkyl radical is methyl.

5. In the method of drilling a well employing a rotary drilling rig and a water base drilling mud containing colloidal clay material suspended therein and sufficient water to render the mud circulatable, the improvement consisting of admixing with said mud between 0.01 and 10.0 pounds, per barrel of mud, of a thinner consisting of the polymer prepared by copolymerizing maleic anhydride and an N-vinyl ring compound selected from the class consisting of N-vinyl morpholinone, N-vinyl pyrrolidone, N-vinyl-2-oxazinidione, N-vinyl-2-oxazolidinone, and substituted N-vinyl-2-oxazolidinones having the formula

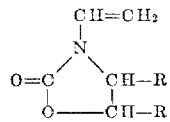

where one R is a substituent selected from the class consisting of methyl, ethyl, and phenyl groups and the other R is selected from the class consisting of hydrogen and the methyl group, said copolymer having a Fikentscher K value of between 11 and 10.

6. In the method of drilling a well employing a rotary drilling rig and a drilling mud selected from oil-water emulsions and water base drilling muds containing colloidal clay material suspended therein and sufficient water to render the same circulatable, the improvement consisting of admixing with said drilling mud between 0.05 and 4.0 pounds, per barrel of mud, of a thinner consisting of a copolymer having a Fikentscher K number of between 11 and 70, prepared by polymerizing between 10 and 90 mole percent of an N-vinyl-5-alkyl-2-oxazolidinone, wherein the alkyl group contains between 1 and 2 carbon atoms, and between 90 and 10 mole percent of maleic anhydride.

7. The method of claim 6 wherein the copolymer consists of a molar ratio of between 47 and 53 moles of each of the N-vinyl-5-alkyl-2-oxazolidinone and the maleic anhydride and has a Fikentscher K value of between 17 and 34.

References Cited in the file of this patent
UNITED STATES PATENTS

| | | |
|---|---|---|
| 2,718,497 | Oldham et al. | Sept. 20, 1955 |
| 2,795,545 | Glusenkamp | June 11, 1957 |
| 2,911,366 | Hedrick et al. | Nov. 3, 1959 |
| 2,913,437 | Johnson | Nov. 17, 1959 |
| 2,919,279 | Walles et al. | Dec. 29, 1959 |
| 2,938,016 | Johnson | May 24, 1960 |
| 3,025,234 | Canterino | Mar. 13, 1962 |

UNITED STATES PATENT OFFICE
CERTIFICATE OF CORRECTION

Patent No. 3,108,956                         October 29, 1963

Charles D. Dever et al.

It is hereby certified that error appears in the above numbered patent requiring correction and that the said Letters Patent should read as corrected below.

Column 8, line 20, after "Composition" insert -- and --; line 25, for "41-gallon" read -- 42-gallon --; column 10, line 2, for "10" read -- 70 --.

Signed and sealed this 21st day of April 1964.

(SEAL)
Attest:

ERNEST W. SWIDER

Attesting Officer

EDWARD J. BRENNER

Commissioner of Patents